United States Patent
Iizaka

(10) Patent No.: US 9,269,005 B2
(45) Date of Patent: Feb. 23, 2016

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventor: Hitoshi Iizaka, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 169 days.

(21) Appl. No.: 14/078,691

(22) Filed: Nov. 13, 2013

(65) Prior Publication Data
US 2014/0133704 A1 May 15, 2014

(30) Foreign Application Priority Data

Nov. 15, 2012 (JP) .................. 2012-251222

(51) Int. Cl.
*G06K 9/00* (2006.01)
*G06K 9/20* (2006.01)

(52) U.S. Cl.
CPC .......... *G06K 9/00671* (2013.01); *G06K 9/2081* (2013.01); *G06K 2209/17* (2013.01)

(58) Field of Classification Search
CPC .......... G06Q 30/0601; G06Q 30/0643; G06Q 30/0635; G06Q 30/0641; G06K 2209/17; G06K 9/00671; G06K 9/2081; G06F 3/0482
See application file for complete search history.

(56) References Cited

U.S. PATENT DOCUMENTS

| 6,363,366 B1 * | 3/2002 | Henty | G01G 19/4144 382/110 |
| 2002/0194074 A1 * | 12/2002 | Jacobs | G06Q 20/20 705/16 |
| 2009/0099883 A1 * | 4/2009 | Wan | G06Q 10/06 705/7.12 |
| 2011/0170787 A1 * | 7/2011 | Gum | G06K 9/00624 382/209 |
| 2012/0047039 A1 * | 2/2012 | Sano | G06Q 20/208 705/23 |

FOREIGN PATENT DOCUMENTS

| JP | 2001-216571 | 8/2001 |
| JP | 2012-252396 | 12/2012 |

* cited by examiner

*Primary Examiner* — Amara Abdi
(74) *Attorney, Agent, or Firm* — Amin, Turocy & Watson, LLP

(57) ABSTRACT

A commodity recognition apparatus acquires an image including a commodity captured by an image capturing module and displays the acquired image on a display module. The commodity recognition apparatus displays a frame border surrounding the commodity on at least a portion of the image displayed on the display module. Moreover, the commodity recognition apparatus recognizes the commodity existing in the frame border according to a feature amount of the image in the area surrounded by the frame border. The commodity recognition apparatus outputs information of the commodity recognized.

14 Claims, 13 Drawing Sheets

| MENU ID | MENU NAME | PRICE | CALORIES | APPEARANCE FEATURE PARAMETER |
|---|---|---|---|---|
| 11111 | A | 60 | 120 | 1100110011001100 |
| 22222 | B | 50 | 200 | 1110001110001110 |
| 33333 | C | 40 | 220 | 0011001100110011 |
| 44444 | D | 80 | 250 | 0101010101010101 |
|  |  |  |  |  |
|  |  |  |  |  |

50

COMMODITY RECOGNITION APPARATUS AND COMMODITY RECOGNITION METHOD

CROSS-REFERENCE TO RELATED APPLICATION

This application is based upon and claims the benefit of priority from Japanese Patent Application No. 2012-251222, filed Nov. 15, 2012, the entire contents of which are incorporated herein by reference.

FIELD

Embodiments described herein relate to a commodity recognition apparatus used in a canteen facility which serves cooked foods in the form of cafeteria and a method for recognizing a commodity by the commodity recognition apparatus.

BACKGROUND

In a canteen facility serving cooked foods in the form of cafeteria, a user takes pre-cooked foods on a tray by himself or herself, or asks a service person to put pre-cooked foods on a tray and then carries out a checkout. Generally, a cashier makes registration of the foods on the tray one by one in a cash register to carry out the checkout. Therefore, there is a problem that it needs time for the checkout in the canteen facility in the form of cafeteria, and thus various ideas are proposed to address the problem.

However, since the conventional proposed recognition apparatus recognizes a container on which commodities (cooked foods) are placed, the container is limited to what is recognizable by the recognition apparatus, therefore the container is less likely to be used due to the limited freedom degree thereof.

DETAILED DESCRIPTION

In an embodiment, a commodity recognition apparatus comprises an image acquisition module, an image display module, a frame border display module, a recognition module and an output module. The image acquisition module acquires an image captured by an image capturing module. The image display module displays, on a display module, the image acquired from the image capturing module. The frame border display module displays a frame border surrounding a commodity on at least a portion of the image displayed on the display module. The recognition module recognizes a commodity existing in the frame border according to a feature amount of the image in the area surrounded by the frame border. The output module outputs information of the commodity recognized by the recognition module.

Embodiments of the commodity recognition apparatus are described below.

The embodiments show a case in which the commodity recognition apparatus is installed in a canteen facility which serves cooked foods in the form of cafeteria, such as a staff or employees canteen or a student canteen, which is used by limited persons.

First, according to the embodiments, the commodity recognition apparatus uses a general object recognition technology. General object recognition refers to a technology of recognizing the category of a target object from the image data obtained by photographing the target object with camera. A computer extracts the appearance feature amount of the target object contained in the image from the image data. Then, the computer calculates a similarity degree by comparing the extracted appearance feature amount with the feature amount data of a reference image registered in a recognition dictionary file and recognizes the category of the target object according to the similarity degree. The technology for recognizing an object contained in an image is described in the following documents:

YANAI Keiji, "The current state and future directions on generic object recognition", Journal of Information Processing Society, Vol. 48, No. SIG16 [Search on Heisei 24 July 26], Internet <URL: http://mm.cs.uec.ac.jp/IPSJ-TCVIM-Yanai.pdf>.

In addition, the technology carrying out a generic object through regional image segmentation for each object is described in following document:

Jamie Shotton: "Semantic Texton Forests for Image Categorization and Segmentation", [Retrieved on Aug. 10, 2010], Internet<URL: http://citeseerx.ist.psu.edu/viewdoc/download?doi=10.1.1.14 5.3036&rep=repl&type=pdf>.

First Embodiment

Figure 1:
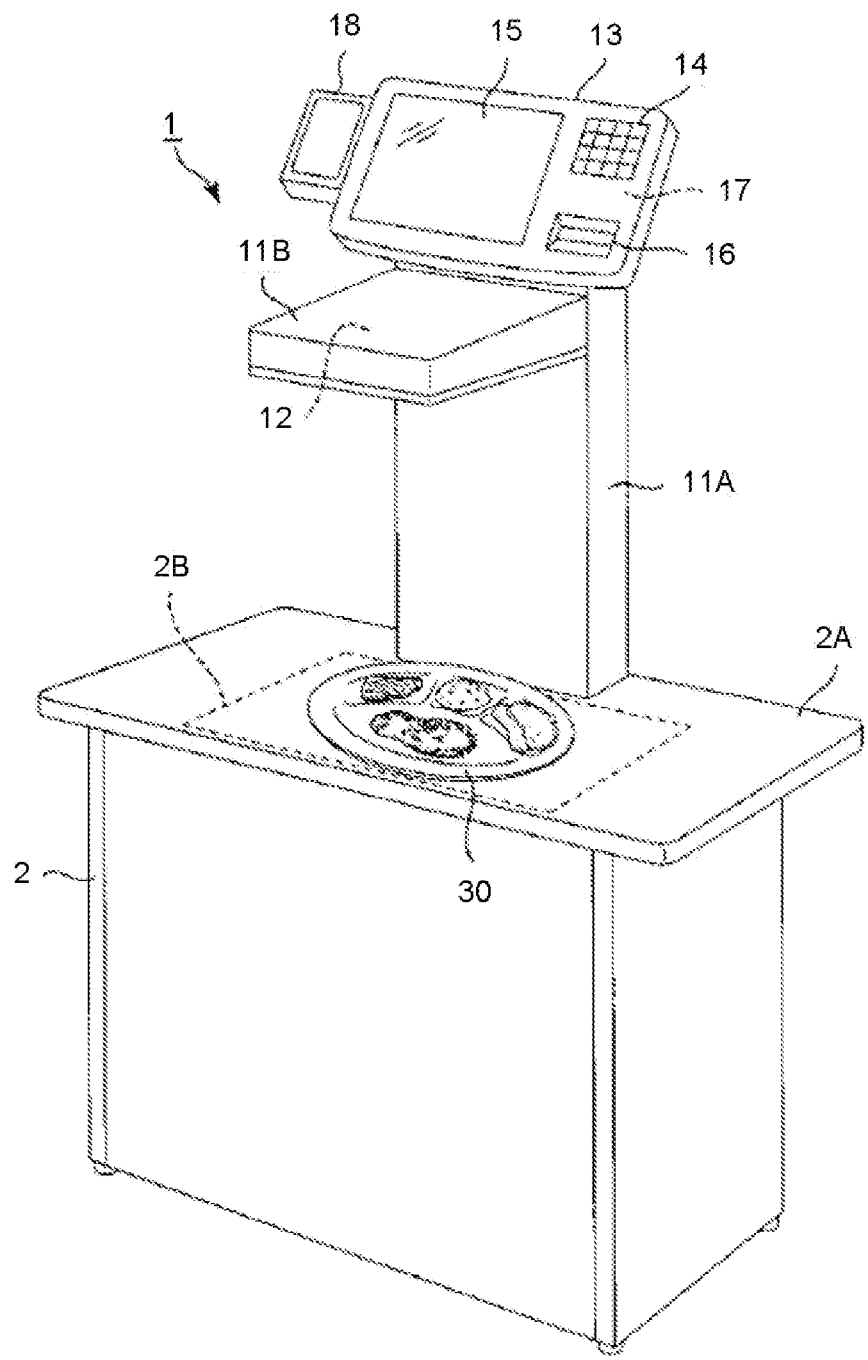
FIG. 1 is an external view illustrating a commodity recognition apparatus according to one embodiment.

FIG. 1 is an external view illustrating a commodity recognition apparatus 1 according to the first embodiment. The commodity recognition apparatus 1 arranged on the worktable 2A of a checkout counter 2 comprises a plate-shaped body module 11A and a shield module 11B. The body module 11A is vertically arranged along the rear side edge of the worktable 2A, with the front surface thereof facing an operator side. The shield module 11B protrudes from the upper end part of the front surface of the body module 11A in a direction substantially orthogonal to the front surface. Thus, the undersurface of the shield module 11B is opposite to the worktable 2A.

An image capturing module 12 is built-in the shield module 11B. Further, a reading window (not shown in the figures) is formed in the undersurface of the shield module 11B. The image capturing module 12 comprises a CCD (Charge Coupled Device) image capturing element serving as an area image sensor and the drive circuit thereof and an image capturing lens for focusing an image of a photography area on the CCD image capturing element. The photography area refers to the area of an image which is focused on the area of the CCD image capturing element through the image capturing lens from the reading window. The image capturing module 12 outputs the image of the photography area focused on the CCD image capturing element through the image capturing lens. The image capturing module 12, which is not limited to be a CCD image capturing element, may also be a CMOS (complementary metal oxide semiconductor) image sensor.

The commodity recognition apparatus 1 further comprises an operation panel 13 and an IC-card reader/writer 18 (hereinafter referred to as a card R/W). The operation panel 13 is arranged on the top of the body module 11A. The operation panel 13 has an operation surface along the front surface side of the body module 11A. A keyboard 14, a touch panel 15 and a receipt issuing opening 16 are arranged on the operation surface of the operation panel 13. The receipt printed by the receipt printer 17 built-in the operation panel 13 is issued from the receipt issuing opening 16.

The card R/W 18 is arranged at one of the side surfaces of the operation panel 13. The card R/W 18 performs read/write operation of data from and into an IC-card, in which a unique user ID and electronic money data are stored. That is, the IC-card has a user ID function and an electronic money function. Each user (e.g. staff, student and the like) of a canteen facility carries an IC card dedicated for the user.

The area 2B at the operator side of the body module 11A on the worktable 2A forms a space for placing a flat-shaped container 30 on which cooked foods (commodities) are put. The area 2B is contained in the photography area of the image capturing module 12. The image capturing module 12 photographs the container 30 on which cooked foods are put. No limitation is given to the shape or number of containers 30 although the container 30 is an exemplary oval shaped tray in FIG. 1. The container 30 can be any food container or tray that is used by the user of a canteen facility to put pre-cooked foods thereon and be carried to the checkout counter 2 and can be placed in the range of the area 2B.

Figure 2:
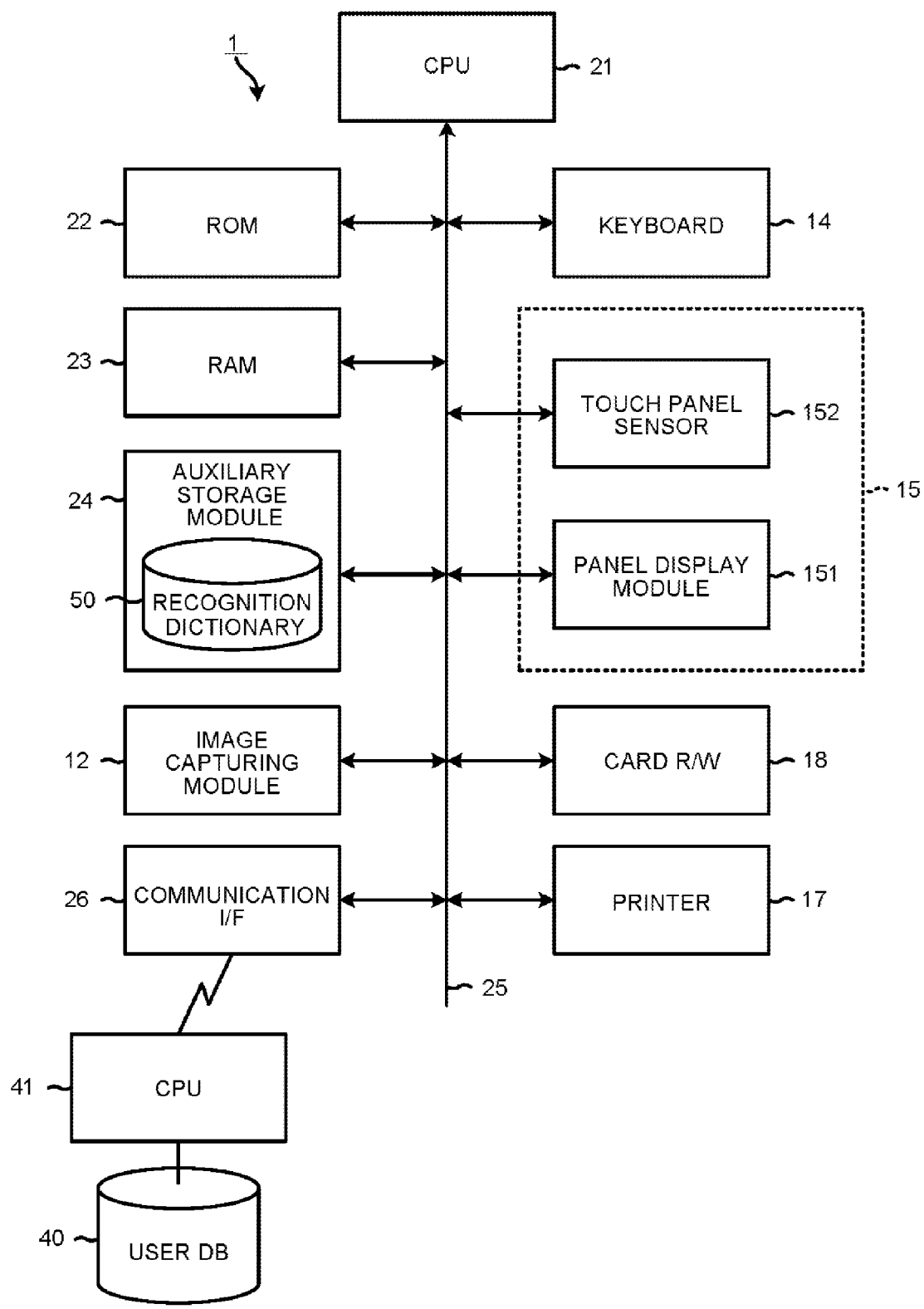
FIG. 2 is a block diagram illustrating a constitution of main portion of the commodity recognition apparatus shown in FIG. 1.

FIG. 2 is a block diagram illustrating a constitution of main portion of the commodity recognition apparatus 1. The commodity recognition apparatus 1 comprises a CPU (Central Processing Unit) 21 constituting the main body of a computer, a ROM (Read Only Memory) 22, a RAM (Random Access Memory) 23 and an auxiliary storage module 24. Moreover, in the commodity recognition apparatus 1, the CPU 21 is connected with the ROM 22, the RAM 23 and the auxiliary storage module 24 via a bus line 25 such as an address bus line or data bus line.

Further, in the commodity recognition apparatus 1, a communication interface 26 is connected with the bus line 25. The commodity recognition apparatus 1 accesses a database server 41 including a user database 40 via the communication interface 26. In the user database 40, personal information such as sex and age, and information relating to a use history of the canteen facility are stored in association with the user ID of each user.

Moreover, in the commodity recognition apparatus 1, the image capturing module 12, the keyboard 14, the touch panel 15, the receipt printer 17 and the card R/W 18 are connected via input/output circuits (not shown). The touch panel 15 includes a panel display module 151 and a touch panel sensor 152 overlaid on the screen of the display module 151.

The CPU 21 constitutes the main control module of the commodity recognition apparatus 1. The ROM 22 stores fixed data such as programs or setting data and the like. The RAM 23 has various memory areas for storing variable data. The auxiliary storage module 24, which is a medium for storing programs or high-capacity data files and the like, may be an HDD (Hard Disk Drive) or an SSD (Solid State Drive). A recognition dictionary file 50 is stored in the auxiliary storage module 24 of the commodity recognition apparatus 1.

Figures 3, 4:
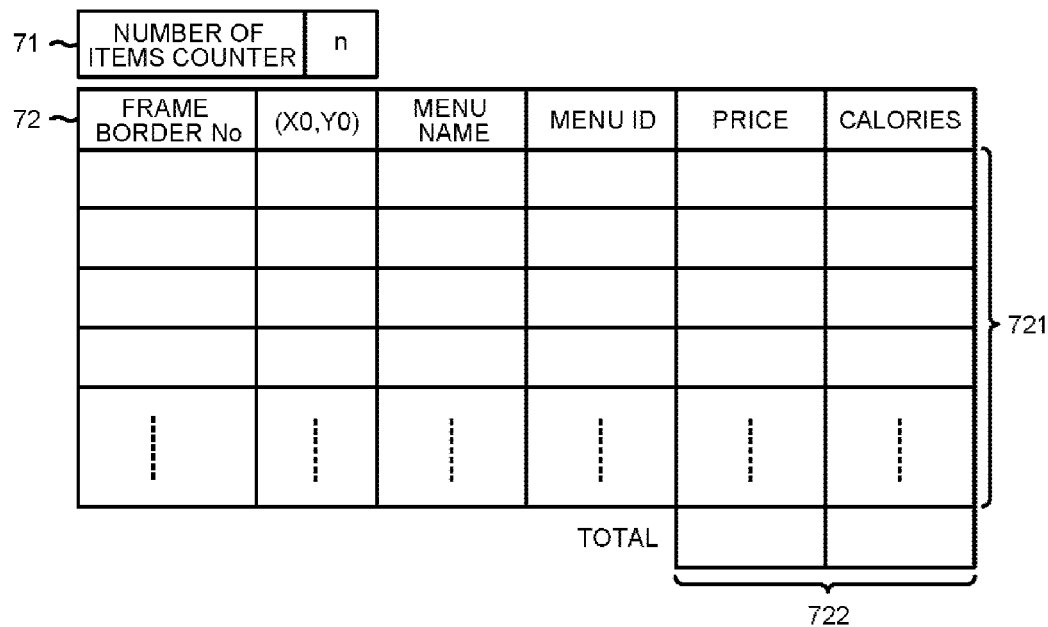
FIG. 3 is a schematic diagram illustrating the data structure of a recognition dictionary file.
FIG. 4 is a schematic diagram illustrating a number of items counter and a detail memory formed in the RAM of the commodity recognition apparatus.

FIG. 3 is a schematic diagram illustrating the data structure of the recognition dictionary file 50. The recognition dictionary file 50 stores recognition dictionary data for each category of cooked food provided to the users in the canteen facility. The recognition dictionary data includes items including menu ID, menu name, price, calorie and appearance feature parameters. The menu ID is a code for identifying the cooked food item. The menu name is a unique name of cooked food item distinguished with a corresponding menu ID. The price is the selling price (Yen) of per unit quantity of cooked food item distinguished with a corresponding menu ID. Calorie refers to calorie (Kcal) derived with respect to the standard quantity of cooked food item distinguished with a corresponding menu ID. The appearance feature parameters refer to variables obtained such that appearance feature, such as, standard shape, surface color, pattern, and concave-convex (surface roughness), of cooked food item distinguished with a corresponding menu ID is parameterized.

Figure 5:
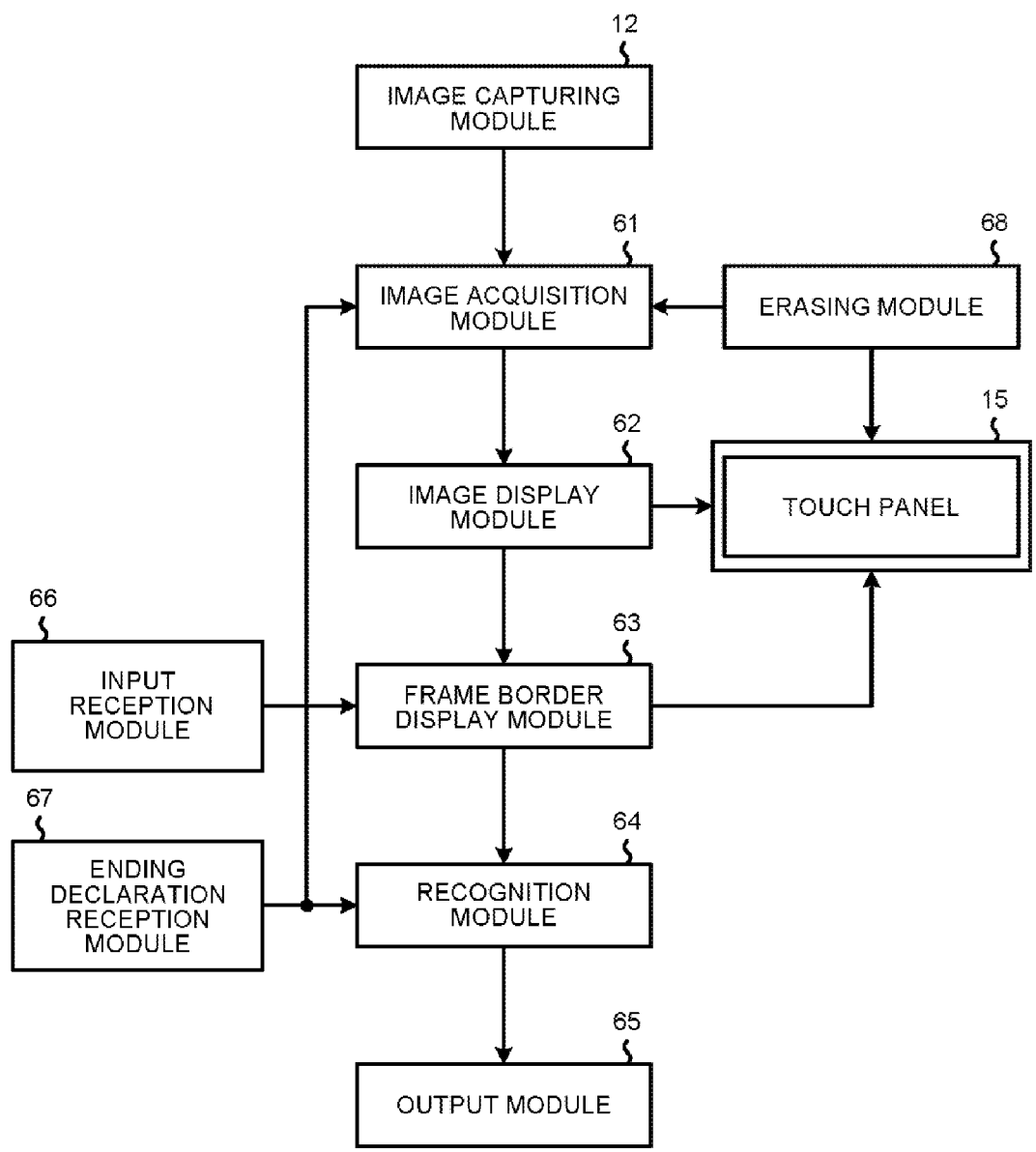
FIG. 5 is a functional block diagram of the commodity recognition apparatus.

As shown in FIG. 5, the commodity recognition apparatus 1 having the aforementioned structure has functions as an image acquisition module 61, an image display module 62, a frame border display module 63, a recognition module 64, an output module 65, an input reception module 66, an ending declaration reception module 67 and an erasing module 68.

The image acquisition module 61 acquires an image captured by the image capturing module 12. The image display module 62 displays the image acquired from the image capturing module 12 on the panel display module 151 of the touch panel 15. The frame border display module 63 displays a frame border surrounding a commodity (cooked food item) on one or more optional portions of the image displayed on the panel display module 151. The recognition module 64 recognizes a commodity (cooked food item) existing in the frame border according to a feature amount of the image in the area surrounded by the frame border. The output module 65 outputs information of the recognized commodity (cooked food item).

The input reception module 66 receives the selection input on an optional portion of the image displayed on the panel display module 151. The frame border display module 63 displays a frame border on the portion at which the selection input is received by the input reception module 66.

The ending declaration reception module 67 receives a recognition ending declaration on a commodity (cooked food item). The erasing module 68 erases the frame border displayed on the panel display module 151. The image acquisition module 61 repeats the image acquisition until the frame border display module 63 displays a frame border on the image. The image acquisition module 61 stops image acquisition once a frame border is displayed. Then, the image acquisition module 61 restarts image acquisition if the ending declaration reception module 67 receives a recognition ending declaration or the erasing module 68 erases all frame borders on the image.

In order to realize the aforementioned functions, the commodity recognition apparatus 1 stores a commodity recognition program in the ROM 22 or in the auxiliary storage module 24. In addition, as shown in FIG. 4, the commodity recognition apparatus 1 forms a number of items counter 71 and a detail memory 72 in the RAM 23. The detail memory 72 comprises an area 721 stacking a detail record including frame border number, cancellation mark coordinates (X0, Y0), menu ID, menu name, price and calorie and, an area 722 storing total price and total calories. The frame border number and the cancellation mark coordinates (X0, Y0) will be described later.

Figure 6:
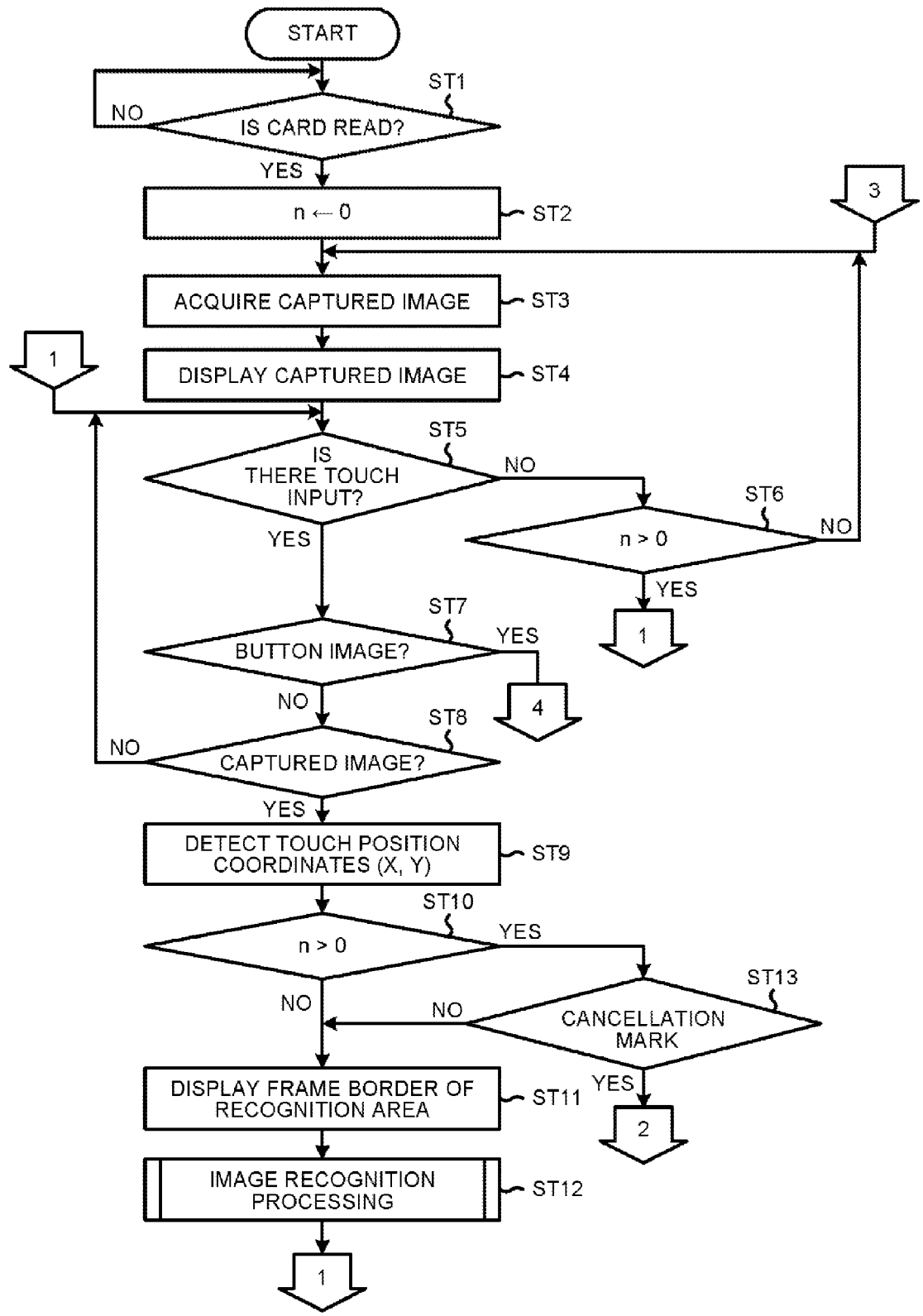
FIG. 6 is a flowchart illustrating the main procedure of an information processing carried out by the CPU of the commodity recognition apparatus according to a commodity recognition program.
Figure 7:
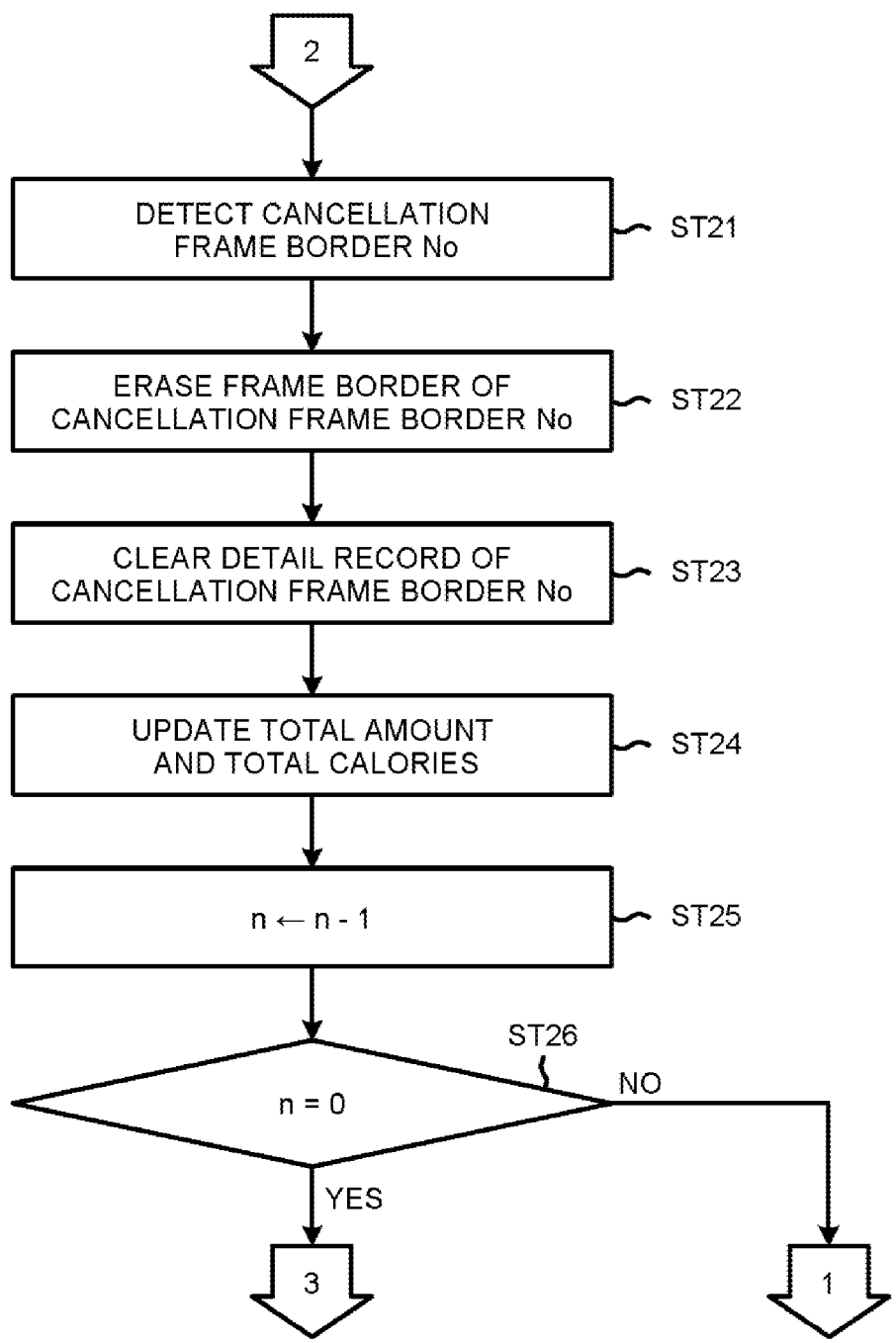
FIG. 7 is a flowchart illustrating the procedure of an information processing carried out after the determination of ST13 in which 'Yes' is taken, shown in FIG. 6.
Figure 8:
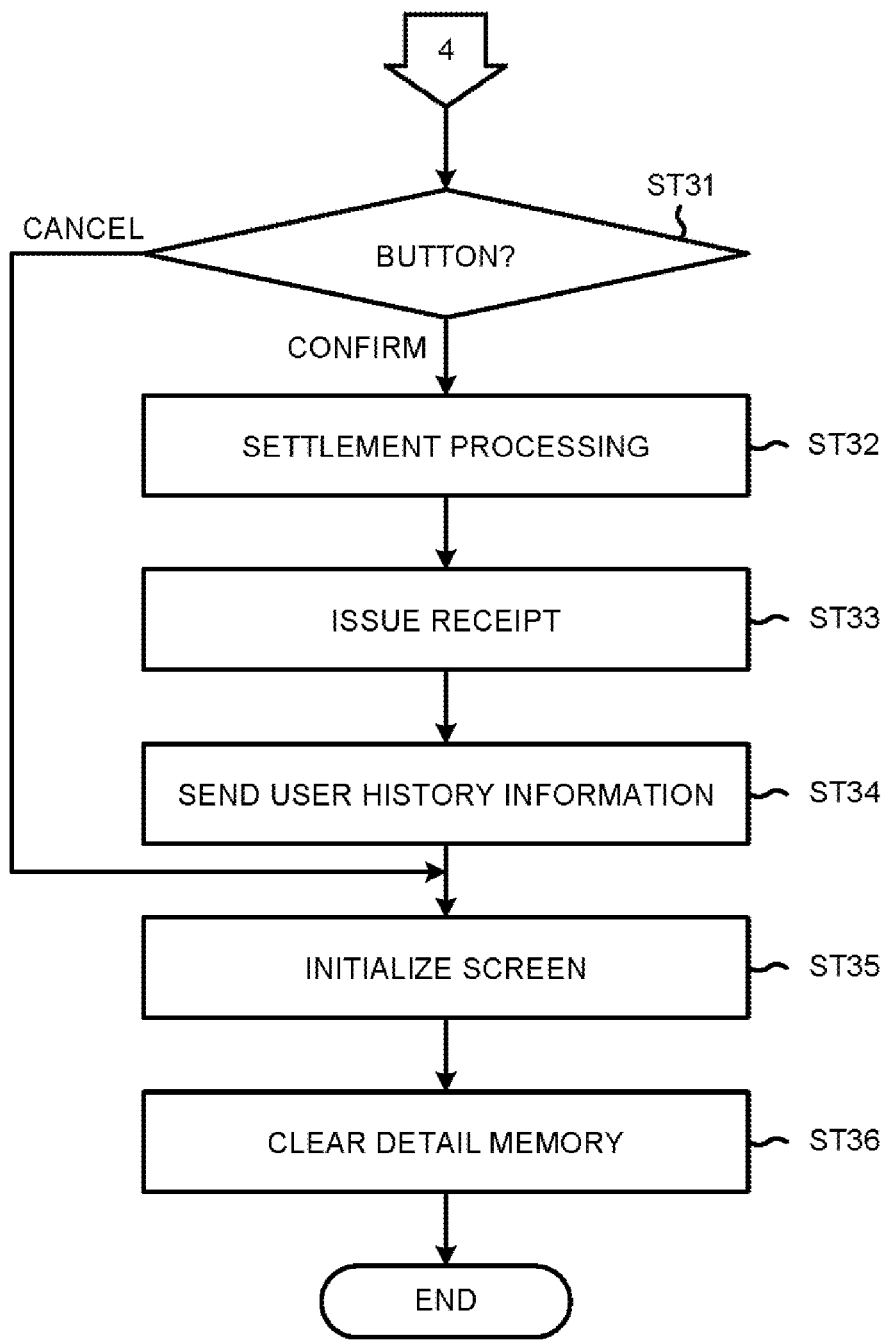
FIG. 8 is a flowchart illustrating the procedure of an information processing carried out after the determination of ST7 in which 'Yes' is taken, shown in FIG. 6.

When the commodity recognition program is started, the CPU 21 starts a processing in the procedure shown in FIG. 6-FIG. 8. First, the CPU 21 waits for the card R/W 18 to read the IC-card (ST1). The CPU 21 does not execute the processing in ACT ST2 until the IC-card is read (No in ST1). If the IC-card is read (Yes in ST1), the CPU 21 resets the number of items counter 71 to "0" (ST2).

Next, the CPU 21 acquires an image (frame image) captured by the image capturing module 12 (ST3: image acquisition module 61). Then, the CPU 21 displays the captured image on the panel display module 151 of the touch panel 15 (ST4: image display module 62).

Figure 10:
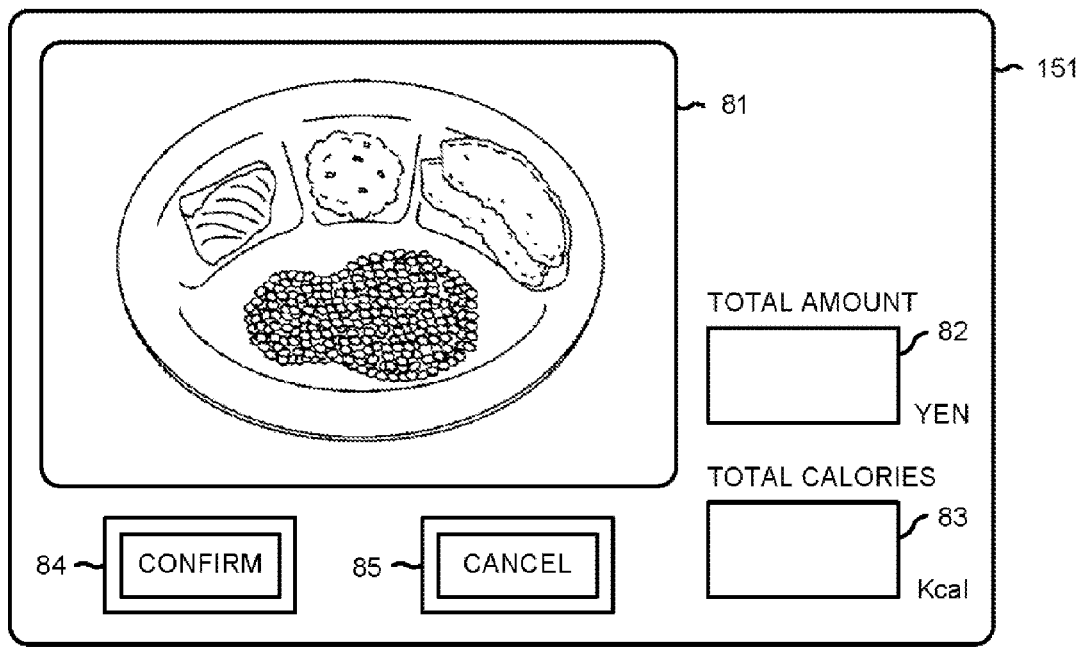
FIG. 10 is a schematic diagram illustrating an example of a screen displayed on the panel display section of a commodity recognition apparatus.

FIG. 10 is a diagram illustrating an example of a screen of the panel display module 151 displaying a captured image 81. As shown in FIG. 10, in addition to the captured image 81, a total amount column 82, a total calories column 83, a confirmation button 84 and a cancellation button 85 are also displayed on the screen.

If the captured image 81 is displayed on the screen of the panel display module 151, the CPU 21 confirms whether or not the screen is touched (ST5). The screen is not touched if the signal from the touch panel sensor 152 is not changed. In this case (No in ST5), the CPU 21 checks the number of items counter 71 (ST6). If the number of items counter 71 is reset to "0" (No in ST6), the CPU 21 returns to the processing in ACT ST3. That is, the CPU 21 acquires a next captured image from the image capturing module 12 (ST3) and displays the next captured image on the panel display module 151 (ST4).

The CPU 21 repeats the acquisition and display of a captured image until the screen is touched. If the screen is touched (Yes in ST5), the CPU 21 confirms which area on the screen is touched (ST7, ST8). If the touched area is not the area of the confirmation button or the cancellation button (No in ST7) and is also not the area of the captured image 81 (No in ST8), the CPU 21 returns to the processing in ACT ST5.

The CPU 21 confirms whether or not the screen is touched (ST5), and checks the number of items counter 71 (ST6) if the screen is not touched (No in ST5). If the number of items counter 71 is reset to "0" (No in ST6), the CPU 21 returns to the processing in ACT ST3.

If the area of the captured image 81 is touched (Yes in ST8), the CPU 21 detects the touch position coordinates (X, Y). The touch position coordinates (X, Y) are defined by taking a reference point, for example, the left lower corner of the area in the captured image 81, as the origin (0, 0) of a two-dimensional coordinate, the right direction starting from the origin (0, 0) as an X direction and the upper direction starting from the original (0, 0) as a Y direction. The CPU 21 calculates the distances from the origin (0, 0) to the touch position in the X direction and in the Y direction and converts the distances to coordinates (X, Y) (ST9).

The CPU 21 stops image the acquisition processing if it is detected that the captured image displayed on the screen is touched to input it. If the acquisition processing is stopped, the captured image 81 is switched to a still picture or image from a moving picture or image. The operator is aware that the image acquisition is completed according to the switching of the captured image to a still image. In addition, the captured image 81 may be set to be a still image by discarding and without displaying the acquired image.

Figure 11:
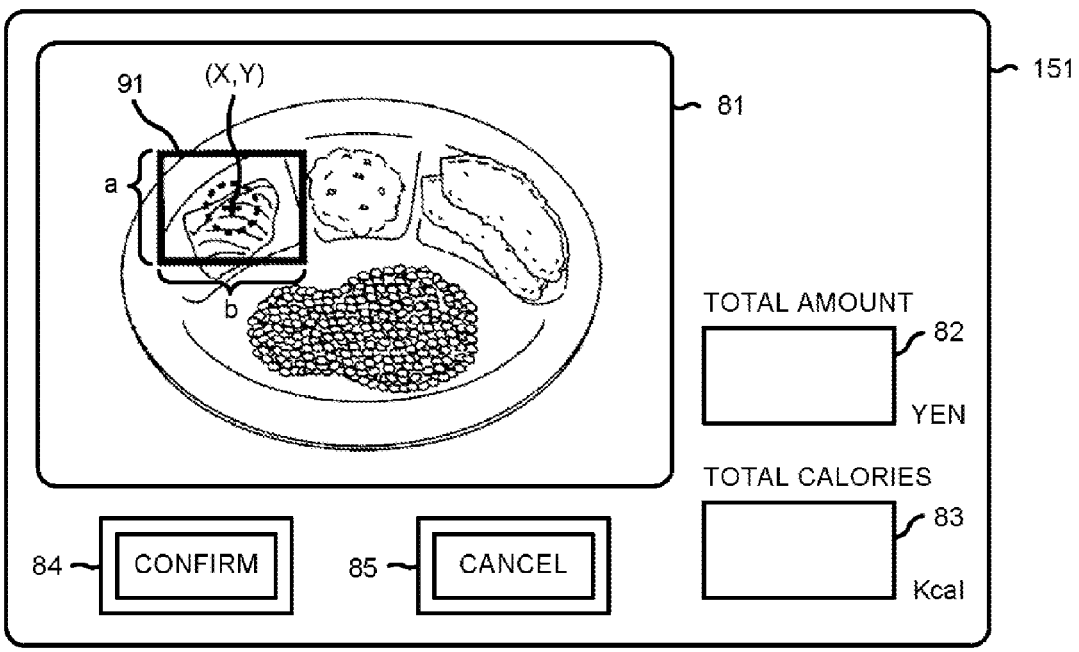
FIG. 11 is a schematic diagram illustrating an example of a screen displayed after a cooked food item is touched on the screen shown in FIG. 10.

The CPU 21 checks the number of items counter 71 (ST10). If the number of items counter 71 is reset to "0" (No in ST10), the CPU 21 determines the recognition area of an image and displays a frame border 91 surrounding the determined recognition area in the area of the captured image 81. As shown in FIG. 11, the CPU 21 displays a quadrangle frame border 91 having a length of a in the vertical direction and a length of b in the horizontal direction by taking the touch position coordinates (X, Y) as the center (ST11: frame border display module).

Figure 9:
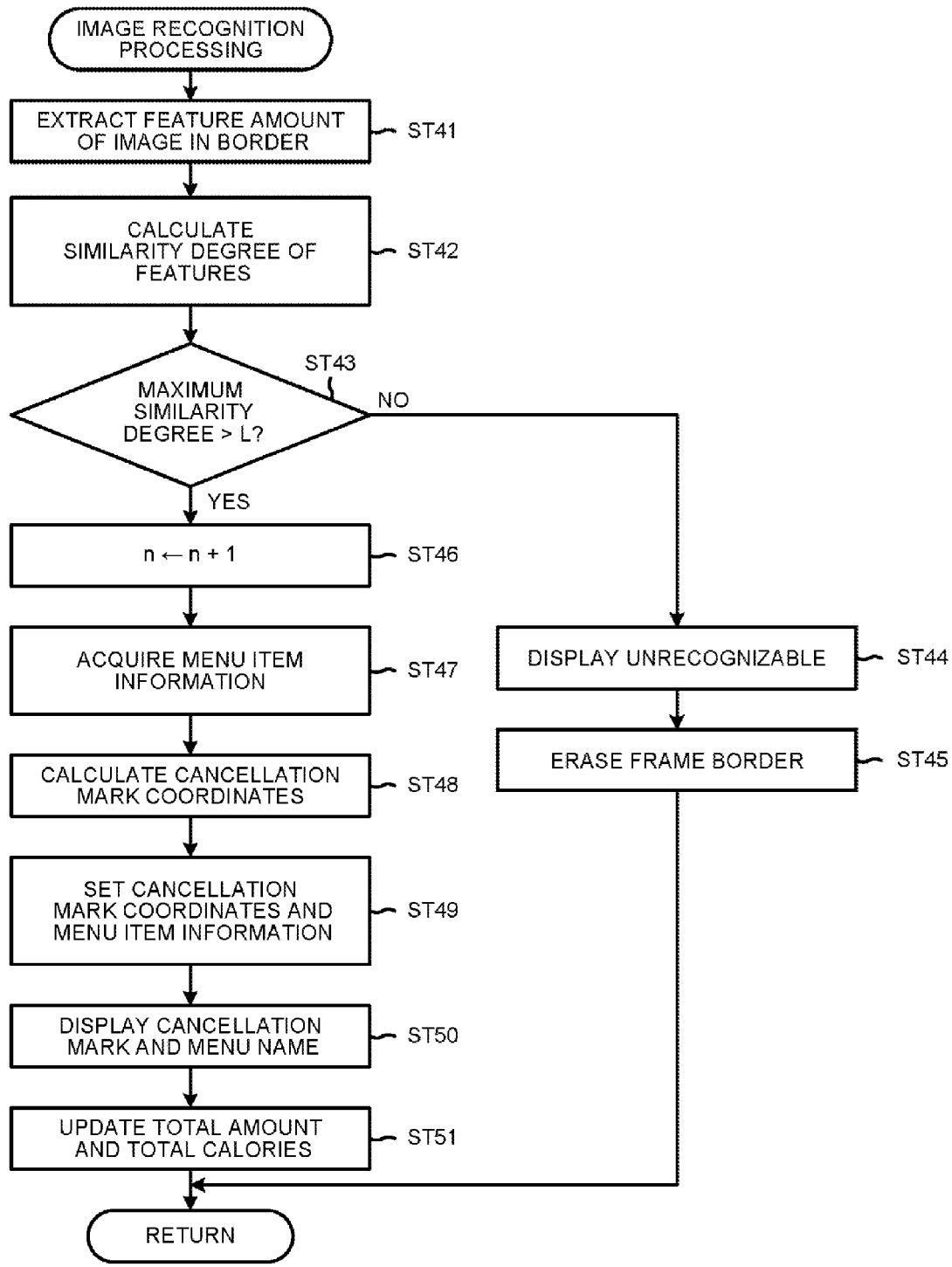
FIG. 9 is a flowchart specifically illustrating the procedure of a screen recognition processing in ST12 shown in FIG. 6.

The CPU 21 executes a screen recognition processing (ST12). FIG. 9 is a flowchart illustrating the specific procedure of a screen recognition processing. First, the CPU 21 extracts appearance feature amounts such as the outline shape, surface color, pattern and concave-convex state and the like according to the image in the region surrounded by the frame border 91 (ST41). Next, the CPU 21 calculates, for the records on all the menu items registered in the recognition dictionary file 50, a similarity degree representing how much similar the feature amount is to the appearance feature amount parameter of the record.

If a similarity degree is calculated for all menu items, then the CPU 21 confirms whether or not the maximum similarity degree is higher than a determination threshold value L (ST43: recognition module 64). The determination threshold value L is a minimum value of similarity degree capable of determining that the object shown in the image in a recognition area is the menu item having the maximum similarity degree if the maximum similarity degree is greater than the determination threshold value L.

If the maximum similarity degree is not higher than the threshold value (No in ST43), the CPU 21 executes the processing in ACTs ST44-ST45. No specific limitation is given to the processing procedure in ACTs ST44-ST45. In ACT ST44, the CPU 21 displays specified message showing that the object is unrecognizable on the panel display module 151. In ACT ST45, the CPU 21 erases the frame border 91 on the screen. Then, the image recognition processing is ended.

On the contrary, if the maximum similarity degree is higher than the determination threshold value L (Yes in ST43), the CPU 21 executes the processing in ACTs ST46-ST48. No specific limitation is given to the processing procedure in ACTs ST46-ST48. In ACT ST46, the CPU 21 counts up the count value of the number of items counter 71 by "1". In ACT ST47, the CPU 21 acquires information (menu ID, menu name, price and calorie) of the menu item having the maximum similarity degree from the recognition dictionary file 50. In ACT ST48, the coordinates of the right upper corner of the frame border 91 are calculated as cancellation mark coordinates (X0, Y0).

Figure 12:
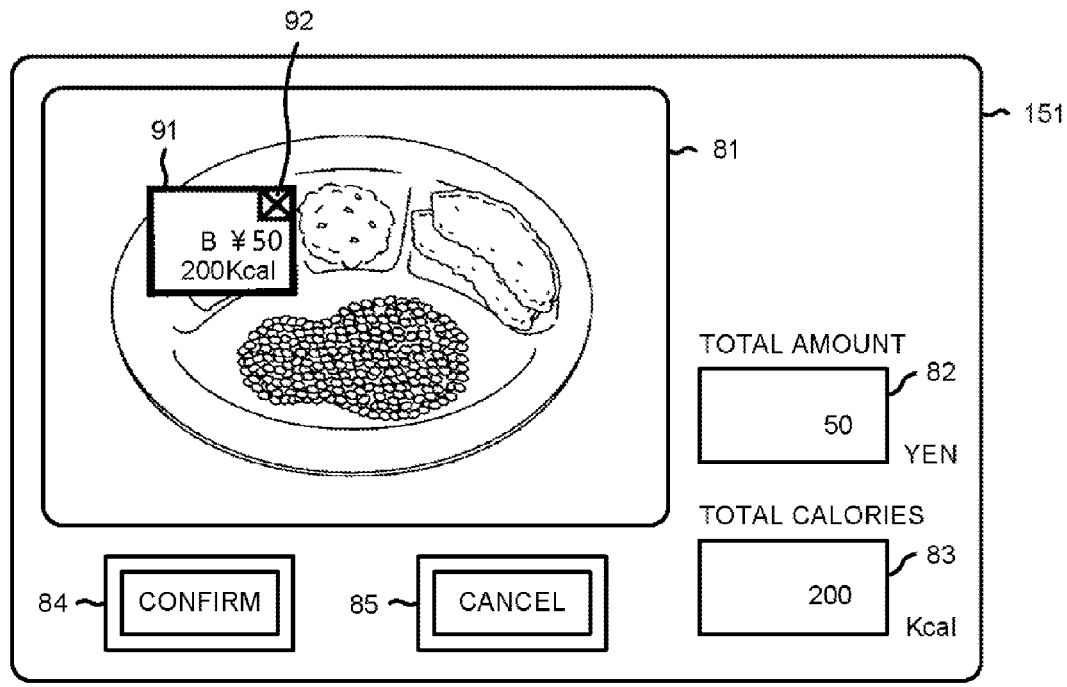
FIG. 12 is a schematic diagram illustrating an example of a screen displayed after a cooked food item is recognized from the screen shown in FIG. 11.

If the processing in ACTs ST46-ST48 is ended, then the CPU 21 sets the cancellation mark coordinates (X0, Y0) and menu item information in the detail record having a frame border number n (n is the count value of the number of items counter 71) in the detail memory 72 (ST49). Next, as shown in FIG. 12, the CPU 21 displays a cancellation mark 92 at the position of the cancellation mark coordinates (X0, Y0). Further, the CPU 21 displays the menu name, the price and the calorie (menu item information) in the frame border 91 (ST50: output module (individual output module) 65). Moreover, the CPU 21 calculates a total amount and total calories according to the data in the detail memory 72 and respectively displays the calculated total amount and total calories in the total amount column 82 and the total calories column 83 on the screen (ST51: output module (total output module) 65). Then, the image recognition processing is ended.

If the image recognition processing is ended, then the CPU 21 returns to the processing in ACT ST5. The CPU 21 confirms whether or not the screen on the panel display module 151 is touched (ST5). If the screen is not touched (No in ST5), the CPU 21 checks the number of items counter 71 (ST6).

At this time, if the number of items counter 71 is reset to "0" (No in ST6), the CPU 21 returns to the processing in ACT ST3. However, if the number of items counter 71 is counted up (Yes in ST6), the CPU 21 returns to the processing in ACT ST5.

Thus, in the case in which the number of items counter 71 is reset to "0", the CPU 21 acquires a new captured image. However, if the number of items counter 71 is counted up, the CPU 21 does not carry out the acquisition of a captured image. The CPU 21 stops the image acquisition. As a result, the captured image acquired the last time is being displayed on the panel display module 151 in a still picture.

Further, if the number of items counter 71 is counted up in ACT ST10 (Yes in ST10), the CPU 21 confirms whether or not the cancellation mark 92 is touched (ST13). The CPU 21 compares the touch position coordinates (X, Y) with the cancellation mark coordinates (X0, Y0) in each detail record stored in the detail memory 72. Consequentially, if the cancellation mark 92 is not touched (No in ST13), the CPU 21 executes the processing in ACTs ST11-ST12.

If the cancellation mark 92 is touched (Yes in ST13), the CPU 21 detects a frame border number from the detail records containing the cancellation mark coordinates (X0, Y0) corresponding to the touch position coordinates (X, Y) (ST21). Then, the CPU 21 erases the frame border 91 discriminated by the frame border number from the screen (ST22: erasing module 68). Besides, the CPU 21 erases the record of the frame border number from the detail memory 72 (ST 23). The CPU 21 calculates a total amount and total calories once more according to the data in the detail memory 72 and updates the display of the total amount column 82 and the total calories column 83 (ST 24).

The CPU 21 counts down the count value of the number of items counter 71 by "1" (ST25). Then, the CPU 21 confirms whether or not the count value n of the number of items counter 71 is "0" (ST26). If the count value is not "0" (No in ST26), the CPU 21 returns to the processing in ACT ST5.

However, if the count value n is "0" (Yes in ST26), the CPU 21 returns to the processing in ACT ST3.

In the case in which the count value n is not "0", the CPU 21 does not carry out the acquisition of new captured image. Thus, the captured image displayed on the panel display module 151 is not changed. However, if the count value n is "0", the CPU 21 restarts the acquisition of captured image. The image being displayed on the panel display module 151 is updated to the latest captured image.

If the button image is touched (Yes in ST7), the CPU 21 confirms which one of the confirmation button 84 and the cancel button 85 is touched (ST31). If the confirmation button 84 is touched (ST31 'confirm': ending declaration acceptance module 67), each processing in ACTs ST32-ST34 is executed.

In ACT ST32, the CPU 21 executes a settlement processing with electronic money. The CPU 21 deducts the total price data from the electronic money data in the IC-card, using the card R/W 18. In ACT ST33, the CPU 21 edits receipt data based on the data in the detail memory 72. Then, the CPU 21 outputs receipt data to the printer 17 to control the issuing of a receipt. In ACT ST34, the CPU 21 edits user history information using the data in the detail memory 72 and the user ID of the IC-card. Then, the CPU 21 sends the user history information to the database server 41 via the communication interface 26. In the database server 41, each user history information is stored in the user database 40 according to corresponding user ID.

If the processing in ACTs ST32-ST34 is ended, the CPU 21 initializes the screen of the panel display module 151 (ST35). Further, the CPU 21 clears the detail memory 72 (ST36).

On the contrary, if the cancel button 85 is touched (ST31: 'cancel'), the CPU 21 does not execute the processing in ACTs ST32-ST34. The CPU 21 initializes the screen of the panel display module 151 (ST35). Further, the CPU 21 clears the detail memory 72 (ST36). Then, the commodity recognition program processing for one user is ended.

In a canteen facility, which serves cooked food in the form of cafeteria, in which the commodity recognition apparatus 1 of the present embodiment is installed, a user puts the container 30, on which cooked foods are individually placed, in the area 2B of the checkout counter 2. The user operates the card R/W 18 to read data in his/her own IC card. In this way, as shown in FIG. 10, the captured image 81 is displayed on the screen of the touch panel 15, and thus, the user touches, one by one, the images of the cooked foods on the container 30.

Now, it is assumed that the user touches the image of the cooked food placed on the left upper part of the container 30. A frame border 91 taking the touch position coordinates (X, Y) as the center is displayed on the captured image 81, as shown in FIG. 11. Then, a recognition processing on the cooked food in the frame border 91 is executed in the commodity recognition apparatus 1.

For example, if the image in the frame border 91 cannot be recognized because the touch position is at the end part of the cooked food, the frame border 91 is erased. A message indicating that the food can not be recognized is displayed on the panel display module 151. In this case, the user touches other part of the image of the cooked food to carry out a recognition processing again.

If the cooked food is recognized on the image in the frame border 91, the name, the price, the calorie of the recognized cooked food item are displayed in the frame border 91, as shown in FIG. 12. Further, a cancellation mark 92 is displayed in the frame border 91. The total amount and total calories of the recognized cooked food are also updated.

The user confirms whether or not the display in the frame border 91 is accurate. The cancellation mark 92 is touched if the display in the frame border 91 is inaccurate. The frame border 91 is erased. Then the user touches other part of the image of the cooked food to carry out a recognition processing again.

Figure 13:
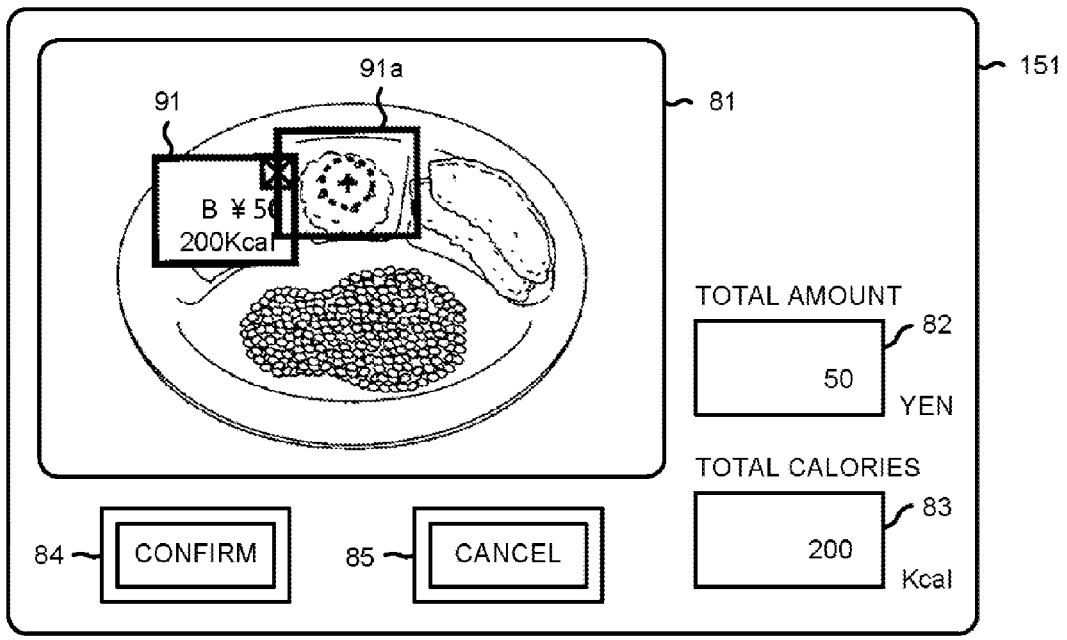
FIG. 13 is a schematic diagram illustrating an example of a screen displayed after another cooked food item is touched on the screen shown in FIG. 12.
Figure 14:
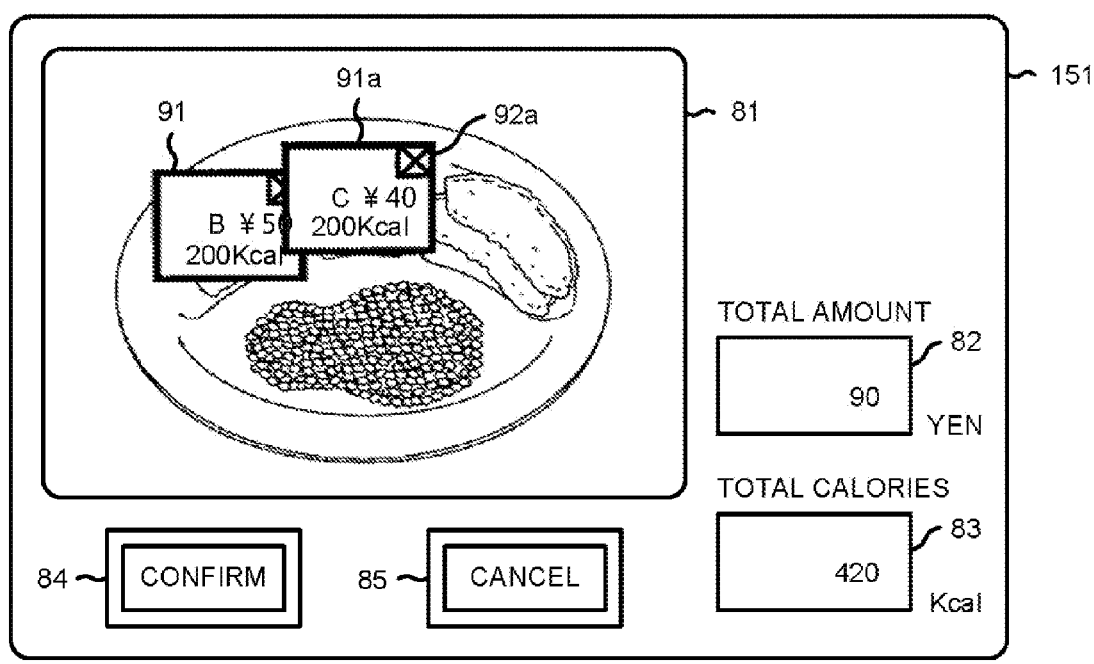
FIG. 14 is a schematic diagram illustrating an example of a screen displayed after a cooked food item is recognized from the screen shown in FIG. 13.

The user touches the image of a second item if the display in the frame border 91 is accurate. For example, it is assumed that the user touches the image of the cooked food at the upper part of the container 30. A frame border 91a is displayed on the captured image 81, as shown in FIG. 13. Then, a recognition processing of the cooked food in the frame border 91 is executed in the commodity recognition apparatus 1. As a result, if the cooked food is recognized, the name, the price, the calorie of the recognized cooked food item are displayed in the frame border 91a, as shown in FIG. 14. Further, a cancellation mark 92 is displayed in the frame border 91. The total amount and total calories of the recognized cooked food are also updated.

The user repeats the touch operation until all the cooked foods on the container 30 are recognized. If all the cooked foods are successfully recognized, the user touches the confirmation button 84. Then, the settlement processing is executed with electronic money for the cooked foods on the container 30, and a receipt is issued from the issuing opening 16. Besides, user history information is sent from the commodity recognition apparatus 1 to the database server 41 to update the use history information of the subject user stored in the database 40.

In this way, the commodity recognition apparatus 1 recognizes the cooked foods on the container 30 one by one, but not recognizes the container 30 on which cooked foods are placed. Thus, the canteen facility serving a cooked food in the form of cafeteria can be operated effectively, without preparing containers 30 which correspond to cooked foods in a one-to-one manner or adding any restriction, such as a special information medium, for the container 30.

Further, the commodity recognition apparatus 1 not only recognizes the cooked foods on the container and but also calculates the prices of the cooked foods to make a total amount. Furthermore, the commodity recognition apparatus 1 automatically settles the bill of the recognized cooked foods, using the electronic money data in the IC card read by the card R/W 18. Therefore, the operation of a canteen facility, including not only the recognition of cooked foods but also the bill settlement, which serves cooked food in the form of cafeteria, can be performed effectively.

Further, the commodity recognition apparatus 1 not only recognizes the cooked foods on the container and but also calculates calories of the cooked foods to make total calories. Moreover, the commodity recognition apparatus 1 sends user history information in which total calories is associated with the user ID of the IC card read by the card R/W 18 to the database server 41. Thus, a service for providing a nutrition management for each user can be easily achieved.

Second Embodiment

According to the first embodiment, a settlement processing is executed if the confirmation button 84 is touched no matter whether or not the recognition processing on all the cooked foods on the container 30 is ended. However, in the second embodiment, no settlement processing is executed if the recognition processing on all the foods on the container 30 is not ended. Such second embodiment is described below with reference to the accompanying drawings FIG. 15-FIG. 17. The commodity recognition apparatus 1 described in the second embedment has the same external appearance and the same internal structure as the commodity recognition apparatus described in the first embodiment, and therefore, the same reference numerals are applied to the similar parts in the second embodiment and detailed descriptions thereof are not repeated.

Figure 15:
FIG. 15 is a schematic diagram illustrating a number of menu items memory formed in the RAM of a commodity recognition apparatus according to a second embodiment.

FIG. 15 is a schematic diagram illustrating a number of menu items memory 73. In the second embodiment, a number of menu items memory 73 is also formed in the RAM 23 of the commodity recognition apparatus 1 in addition to the number of item counter 71 and the detail memory 72.

Figure 16:
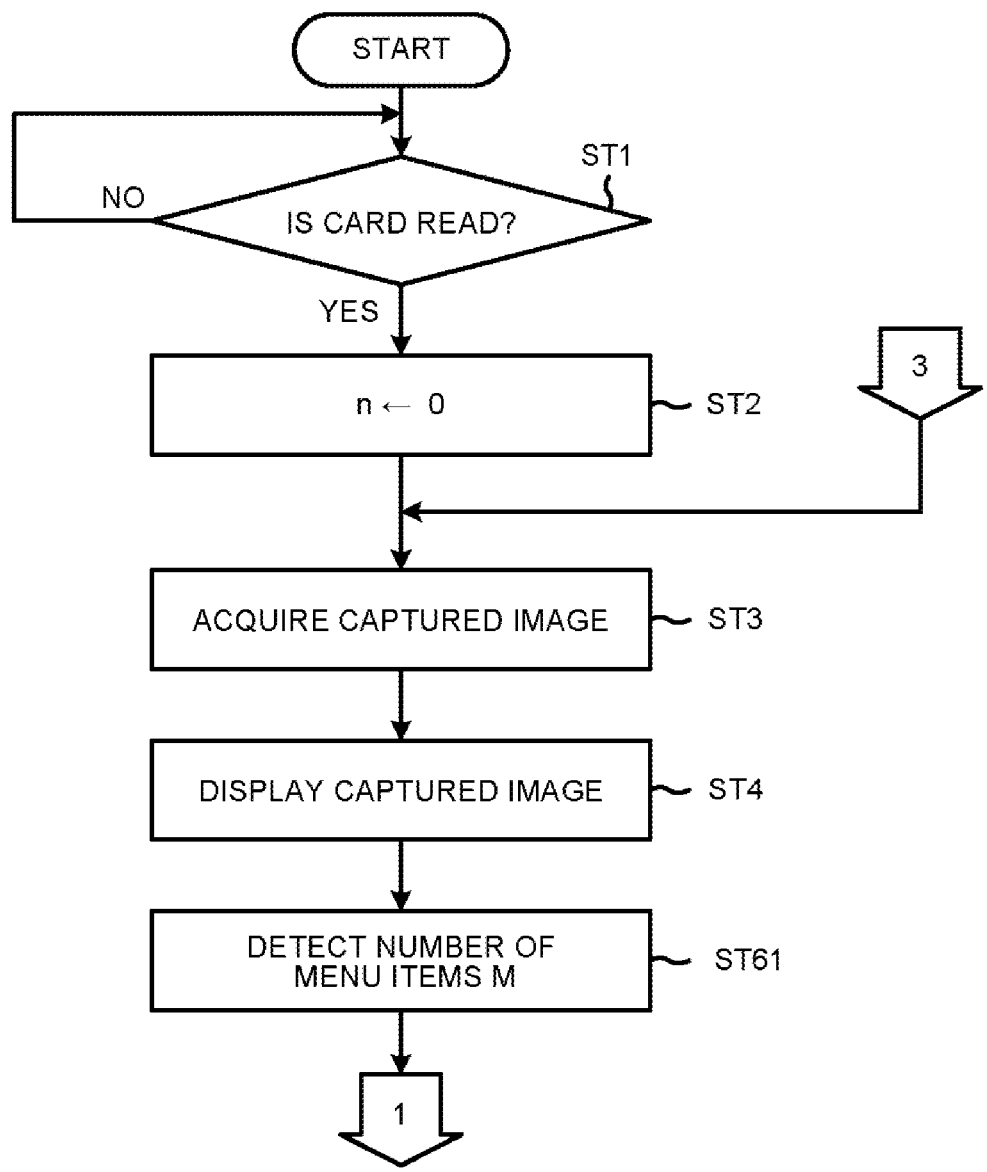
FIG. 16 is a flowchart illustrating main procedure of an information processing carried out by the CPU of the commodity recognition apparatus according to a commodity recognition program in the second embodiment.

FIG. 16 is a flowchart illustrating main procedure of an information processing executed by the CPU 21 when a commodity recognition program is started. In the second embodiment, after displaying the captured image acquired in ACT ST3 on the panel display module 151, the CPU 21 analyzes the image and detects number of the items M of the cooked foods on the container 30 (ST61: number of items detection module).

Specifically, the image of the container 30 on which no cooked foods is placed is previously stored in the auxiliary storage module 24 as a background image. The CPU 21 recognizes the outline of an area in which cooked foods are placed according to the difference between the captured image and the background image. The CPU 21 detects the number of items M of cooked foods according to the shape of the outline. The number of items M detected is stored in the number of menu items memory 73. If the number of items M is detected, the CPU 21 proceeds to the processing in ACT ST5 in the first embodiment (refer to FIG. 6).

Figure 17:
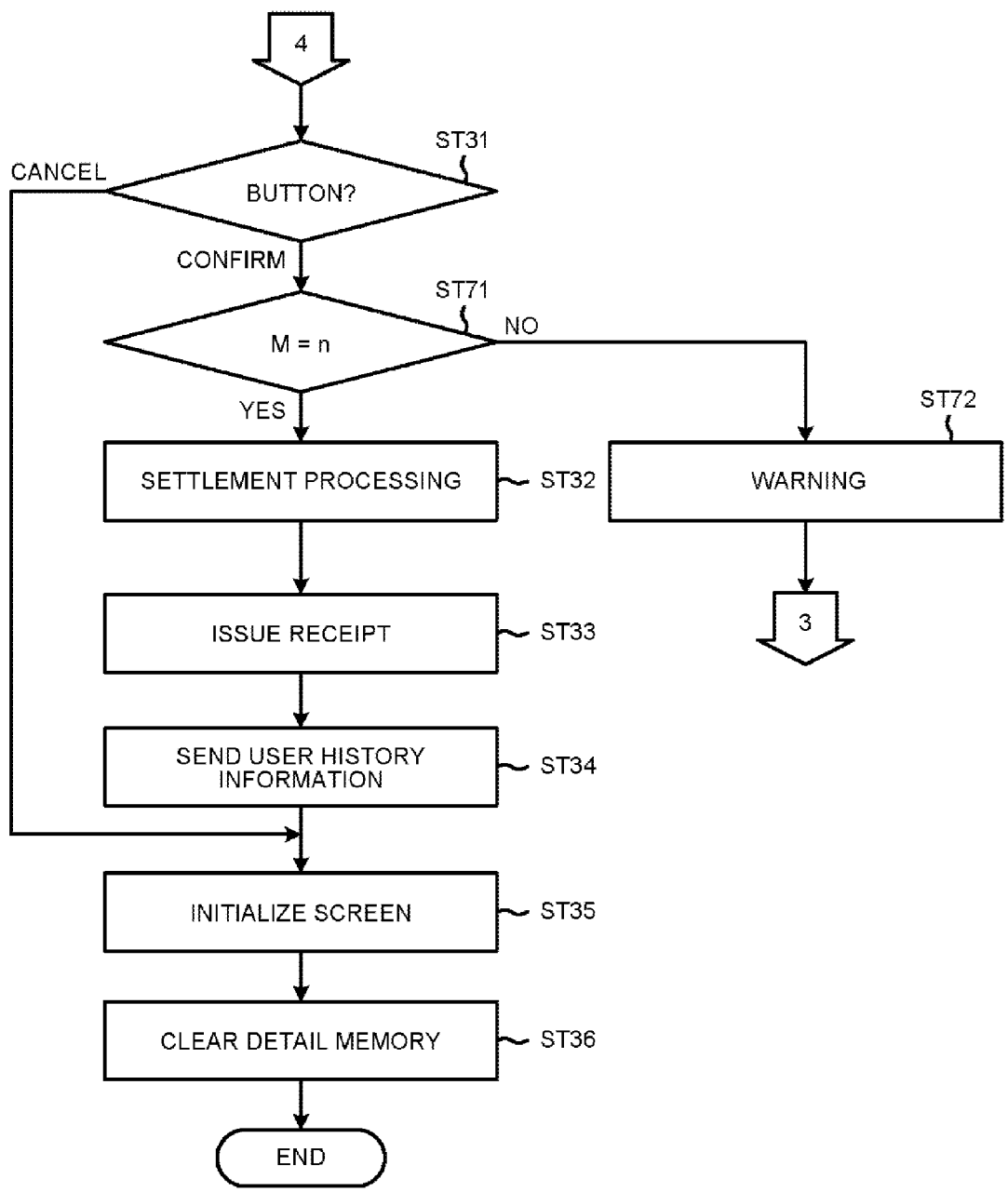
FIG. 17 is a flowchart illustrating the procedure of an information processing carried out after the determination of ST7 in which 'Yes' is taken in the second embodiment.

FIG. 17 is a flowchart illustrating the procedure of an information processing carried out by the CPU 21 if it is detected that a button image is touched in the processing in ACT ST7. In the second embodiment, if confirming the touched button image is the image of the confirmation button 84 ('confirmation' in ST31), the CPU 21 confirms whether or not the count value n in the number of items counter 71 (number of items counting module) accords with the value M in the number of menu items memory 73 (ST71: comparison module). If the two values are the same (Yes in ST71), the CPU 21 proceeds to the settlement processing in ACT ST32.

On the contrary, if the count value n of the number of items counter 71 is different from the value M in the number of menu items memory 73 (No in ST71), the CPU 21 displays, on the panel display module 151, warning message that the recognition on cooked foods items are not ended (ST72). Then, the CPU 21 returns to the processing in ACT ST5.

According to the commodity recognition apparatus 1 in the second embodiment, the settlement can not be carried out unless the count value n in the number of items counter 71 accords with the value M in the number of menu items memory 73. Thus, a problem that a settlement processing is carried out before the recognition processing on all the cooked foods on the container 30 is ended is prevented.

The present invention is not limited to the aforementioned first and second embodiments. For example, the installation location and the hardware constitution of the commodity recognition apparatus 1 can be embodied in various forms.

Further, a commodity recognition apparatus 1 which supports an electronic money settlement is exemplarily illustrated in the aforementioned first and second embodiments, however, no specific limitation is given to the settlement method, which may be a credit settlement or a cash settlement. Alternatively, the commodity recognition apparatus 1 may have no settlement function. In this case, the commodity recognition apparatus 1 is connected with a settlement terminal such as a POS (Point Of Sales) terminal via a communication line. The commodity recognition apparatus 1 sends information of the recognized cooked food item to the POS terminal.

Besides, in the aforementioned embodiments, the recognition dictionary file 50 is stored in the auxiliary storage module 24 of the commodity recognition apparatus 1, however, the recognition dictionary file 50 is not limited to be stored in the auxiliary storage module 24. For example, the recognition dictionary file 50 may be stored in a storage device externally connected with the commodity recognition apparatus 1, and the CPU 21 accesses the storage device to retrieve the data in the recognition dictionary file 50, if needed.

In the aforementioned embodiments, the frame border 91 is set to be a quadrangle having a vertical length of "a" and a horizontal length of "b", however, no specific limitation is given to the size or the shape of the frame border 91. Further, a function of changing the size or the shape of the frame border displayed on the panel display module 151 may be added. With this function, since the image of a cooked food can be surrounded by a frame border accurately, it is expected to increase the recognition rate.

Besides, in the aforementioned embodiments, the frame border 91 is cancelled if the cancellation mark 92 is touched, however, the frame border 91 may be cancelled by detecting whether or not the frame border 91 containing the cancellation mark 92 is touched.

Besides, the cooked foods on a container are recognized in the aforementioned embodiments, however, the recognition object may also be a commodity different from cooked foods in the aforementioned embodiments, calorie is illustrated as a parameter derived with respect to a standard quantity of a commodity, however, the parameter, which is not limited to be calories, may also be protein, fat, calcium or other nutritional ingredients.

Further, in the aforementioned embodiments, the image acquisition module 61 repeats the image acquisition until the frame border 91 is displayed on an image and stops the image acquisition if the frame border 91 is displayed, however, the image acquisition module 61 may include a modification in which the displayed image becomes a still image by discarding the acquired image.

In the second embodiment, the warning module displays a message if the count value n in the number of items counter 71 is different from the value M in the number of menu items memory 73, however, the warning module is not limited to this case. The warning module may issue a warning through a voice or speech module as well.

Further, in the embodiments above, a control program capable of achieving the functions of the present invention is previously stored in the auxiliary storage module 24 or ROM 22 serving as a program storage module in the apparatus. However, the present invention is not limited to this case; the same program can also be downloaded to the apparatus through a network. Alternatively, the same program recorded in a recording medium can also be installed in the apparatus. The recording medium may be in any form as long as the recording medium can store programs and is apparatus-readable like a CD-ROM and a memory card and the like. Further, the function acquired by an installed or downloaded program can be also realized by cooperating with the OS (Operating System) and the like inside the apparatus. Moreover, the program in the embodiment may be assembled in a portable information terminal such as a portable telephone having a communication function, or a so-called PDA (Portable Digital Assistant) to realize functions.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
a memory that stores executable instructions; and
a processor, coupled to the processor, that facilitates execution of the executable instructions to perform operations, comprising:
acquiring an image including a commodity captured by an image capturing module;
displaying, on a display module, the image acquired from the image capturing module;
receiving a selection input on a portion of the image displayed on the display module;
displaying a frame border surrounding a commodity included in the selection input;
recognizing the commodity existing within the frame border according to a feature amount of the image in an area surrounded by the frame border;
outputting information associated with recognizing the commodity;
repeating the acquiring of the image until the frame border is displayed on the image; and
stopping the acquiring of the image if the frame border is displayed.

2. The commodity recognition apparatus according to claim 1, wherein the operations further comprise:
receiving a recognition ending declaration associated with the commodity, and
restarting image acquisition if the recognition ending declaration is received.

3. The commodity recognition apparatus according to claim 1, wherein the operations further comprise:
erasing the frame border displayed on the display module, and
restarting the image acquisition the frame border on the image is erased.

4. The commodity recognition apparatus according to claim 1, wherein the operations further comprise
individually outputting information associated with the commodity and outputting total information associated with all recognized commodities.

5. The commodity recognition apparatus according to claim 4, wherein
the information associated with the commodity includes a unit price for the commodity, and the total information associated with all recognized commodities includes a total amount obtained by totaling the unit price of each commodity.

6. The commodity recognition apparatus according to claim 4, wherein
the information associated with the commodity is a parameter derived with respect to a standard quantity of the commodity, and the total information associated with all recognized commodities is a total parameter obtained by totaling the parameter of each commodity.

7. The commodity recognition apparatus according to claim 1, wherein the operations further comprise:

detecting, according to the image acquired by the image acquisition module from the image capturing module, a first number of commodities imaged in the image;

counting a second number based on the commodities; and comparing the first number of items detected with the second number of items counted.

8. A commodity recognition method, including:

acquiring a captured image including a commodity;

displaying the acquired image;

receiving a selection input on a portion of the image displayed;

displaying a frame border surrounding a commodity the selection input of which is received;

repeating until the frame border is displayed on the image;

stopping if the frame border is displayed;

recognizing the commodity existing in the frame border according to a feature amount of the image in the area surrounded by the frame border; and outputting information of the recognized commodity.

9. The commodity recognition method according to claim 8, wherein the image acquisition is restarted if a recognition ending declaration is received.

10. The commodity recognition method according to claim 8, wherein the image acquisition is restarted if all the frame borders are erased from the image.

11. The commodity recognition method according to claim 8, wherein information of recognized commodity is output individually, and the total information of all the recognized commodities is output.

12. The commodity recognition method according to claim 11, wherein the information of the commodity includes a unit price for the commodity, and the total information of the commodity includes a total amount obtained by totaling the unit price of each commodity.

13. The commodity recognition method according to claim 11, wherein the information of the commodity is a parameter derived with respect to a standard quantity of the commodity, and the total information of the commodities is a total parameter obtained by totaling the parameter of each commodity.

14. The commodity recognition method according to claim 8, further including:

detecting the number of the commodities imaged in the image displayed according to the acquired image;

counting the number of the recognized commodities; and comparing the detected number of items with the counted number of items.

* * * * *